US012463452B2

(12) United States Patent
Hakushima et al.

(10) Patent No.: US 12,463,452 B2
(45) Date of Patent: Nov. 4, 2025

(54) POWER SUPPLY CONTROL DEVICE

(71) Applicant: DENSO TEN Limited, Kobe (JP)

(72) Inventors: Daiki Hakushima, Kobe (JP); Takeshi Matsumoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 23 days.

(21) Appl. No.: 18/425,810

(22) Filed: Jan. 29, 2024

(65) Prior Publication Data

US 2024/0258825 A1 Aug. 1, 2024

(30) Foreign Application Priority Data

Jan. 30, 2023 (JP) .................................. 2023-011573
Dec. 14, 2023 (JP) .................................. 2023-210996

(51) Int. Cl.
*H02J 9/06* (2006.01)
*B60L 1/02* (2006.01)
*B60L 1/14* (2006.01)

(52) U.S. Cl.
CPC .................... *H02J 9/06* (2013.01); *B60L 1/02* (2013.01); *B60L 1/14* (2013.01); *H02J 2310/48* (2020.01)

(58) Field of Classification Search
CPC . H01J 9/06; H01J 2310/48; B60L 1/02; B60L 1/14

USPC .......................................................... 307/23
See application file for complete search history.

(56) References Cited

U.S. PATENT DOCUMENTS

2023/0085180 A1* 3/2023 Hakushima ............. B60R 16/03
361/63

FOREIGN PATENT DOCUMENTS

JP 2022-125004 A 8/2022

* cited by examiner

*Primary Examiner* — Hal Kaplan
(74) *Attorney, Agent, or Firm* — Oliff PLC

(57) ABSTRACT

A controller of a power supply control device includes: a comparison circuit configured to compare a parameter related to a power supply failure of a first system or of a second system with a threshold and to output a detection signal indicating an occurrence of the power supply failure; a pulse generator configured to output a pulse signal having a predetermined pulse width in response to receiving the detection signal and to disconnect the connection device to disconnect connection between the first system and the second system during a period in which the pulse signal is output; a latch circuit configured to latch the pulse signal; and a microcomputer configured to periodically acquire a latch state of the latch circuit and to determine, in response to detecting that the pulse signal is latched, in which of the first system and the second system the power supply failure occurs.

12 Claims, 12 Drawing Sheets

POWER SUPPLY CONTROL DEVICE

CROSS-REFERENCE TO RELATED APPLICATIONS

This application is based upon and claims the benefit of priorities from prior Japanese patent application No. 2023-11573, filed on Jan. 30, 2023, and Japanese patent application No. 2023-210996, filed on Dec. 14, 2023, the entire contents of which are incorporated herein by reference.

TECHNICAL FIELD

Embodiments disclosed herein relate to a power supply control device.

RELATED ART

There has been a power supply device including a first system that supplies electric power from a first power supply to a first load, a second system that supplies electric power from a second power supply to a second load, an inter-system switch that connects the first system and the second system, and a control unit that controls the inter-system switch (see JP2022-125004A).

The control unit includes a first control unit and a second control unit. The second control unit compares a voltage of the first system and a voltage of the second system with a threshold using a comparator, and detects that a power supply failure such as a ground fault occurs in the first system or the second system based on a comparison result. The second control unit disconnects the inter-system switch during a period in which an occurrence of the power supply failure is detected.

When the occurrence of the power supply failure is detected by the second control unit, the first control unit inspects the first system and the second system, and executes a fail-safe control by the normal power supply system in which no power supply failure occurs.

According to the power supply device disclosed in JP2022-125004A, it is possible to prevent an influence of a ground fault on a normal system by immediately detecting a tendency of the ground fault in which the voltage is decreased by the second control unit by hardware and disconnecting the inter-system switch. After that, since the first control unit inspects the normal system in which no power supply failure occurs and executes the fail-safe control using the normal system, the fail-safe control may be reliably executed.

SUMMARY

However, in the power supply device described in JP2022-125004A, when the voltage of the first system and the voltage of the second system vibrate due to noise, there is a possibility that conduction and disconnection of the inter-system switch are repeated.

In this case, even when a ground fault actually occurs, the power supply device repeats conduction and disconnection of the inter-system switch during a period from detection of a power supply failure to completion of inspection of the first system and the second system. Thus, while the inter-system switch is conducted, the electric power for use in the fail-safe control is lost.

An aspect of the present disclosure has been made in view of the above, and relates to providing a power supply control device that are capable of preventing a decrease in an amount of stored electric power for use in a fail-safe control.

According to an aspect of the present disclosure, there is provided a power supply control device including: a controller configured to control a connection device provided in an inter-system line connecting a first system and a second system, the first system being configured to supply electric power from a first power supply to a first load, the second system being configured to supply electric power from a second power supply to a second load, in which the controller includes: a comparison circuit configured to compare a parameter related to a power supply failure of the first system or of the second system with a threshold and to output a detection signal indicating an occurrence of the power supply failure; a pulse generator configured to output a pulse signal having a predetermined pulse width in response to receiving the detection signal and to disconnect the connection device to disconnect connection between the first system and the second system during a period in which the pulse signal is output; a latch circuit configured to latch the pulse signal; and a microcomputer configured to periodically acquire a latch state of the latch circuit and to determine, in response to detecting that the pulse signal is latched, in which of the first system and the second system the power supply failure occurs.

A power supply control device according to an aspect of the present disclosure may prevent a decrease in an amount of stored electric power for use in a fail-safe control.

BRIEF DESCRIPTION OF DRAWINGS

Exemplary embodiment(s) of the present invention will be described in detail based on the following figures, wherein.

DESCRIPTION OF EMBODIMENTS

Hereinafter, embodiments of a power supply control device and a power supply control method will be described in detail with reference to the accompanying drawings. The present disclosure is not limited to the following embodiments. Hereinafter, a power supply control device that is mounted on a vehicle having an autonomous driving function and supplies electric power to a load will be described as an example.

Hereinafter, a case where the vehicle on which the power supply control device is mounted is an electric vehicle or a hybrid vehicle is described, and the vehicle on which the power supply control device is mounted may be an engine automobile that travels by using an internal combustion engine.

1. Configuration of Power Supply Control Device According to First Embodiment

Figure 1:
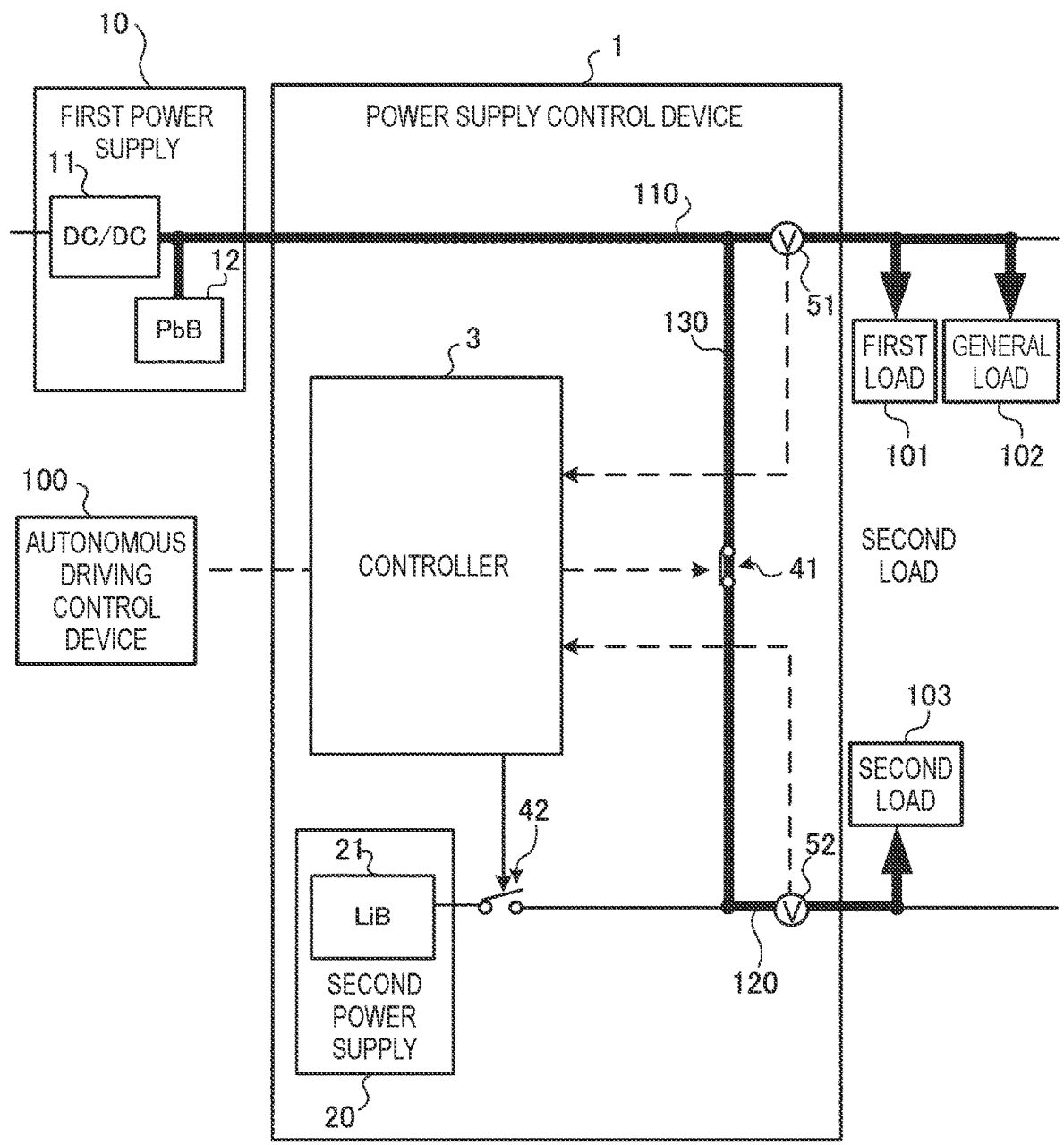
FIG. 1 is a diagram illustrating a configuration and an operation of a power supply control device according to a first embodiment.

A configuration and an operation of a power supply control device 1 according to the first embodiment will be described with reference to FIGS. 1 to 4. FIGS. 1 to 4 are diagrams illustrating the configuration and the operation of the power supply control device 1 according to the first embodiment. As illustrated in FIG. 1, the power supply control device 1 according to the first embodiment is connected to a first power supply 10, a first load 101, a general load 102, a second load 103, and an autonomous driving control device 100.

The power supply control device 1 includes a first system 110 and a second system 120. The first system 110 is a power supply system that supplies electric power from the first power supply 10 to the first load 101 and the general load 102. The second system 120 is a power supply system that supplies, to the second load 103, electric power from a second power supply 20 to be described later.

The first load 101 includes a load for autonomous driving. The first load 101 includes a steering motor that operates during autonomous driving, an electric brake device, an in-vehicle camera, and the like. The general load 102 includes a display, an air conditioner, audio, video, and various lights.

The second load 103 has a part of an autonomous driving function of the first load 101. The second load 103 includes a device required at the minimum for fail-safe control (FOP), such as a steering motor, an electric brake device, and a radar. The first load 101, the general load 102, and the second load 103 operate with electric power supplied from the power supply control device 1.

The autonomous driving control device 100 is a device that executes an autonomous driving control of the vehicle by operating the first load 101 and the second load 103. When a power supply failure such as a ground fault occurs in the first system 110 during autonomous driving, the autonomous driving control device 100 may execute the FOP using the second load 103. When a power supply failure such as a ground fault occurs in the second system 120, the autonomous driving control device 100 may execute the FOP using the first load 101.

The first power supply 10 includes a DC/DC converter (hereinafter, referred to as "DC/DC 11") and a lead battery (hereinafter, referred to as "PbB 12"). The battery of the first power supply 10 may be any secondary battery other than the PbB 12.

The DC/DC 11 is connected to a generator and a high-voltage battery having a higher voltage than the PbB 12. The DC/DC 11 steps down a voltage of the generator and the high-voltage battery and outputs the stepped-down voltage to the first system 110. The generator is an alternator that converts kinetic energy of a traveling vehicle into electricity and generates electric power. The high-voltage battery is a vehicle driving battery mounted on an electric vehicle or a hybrid vehicle.

When the first power supply 10 is mounted on an engine automobile, the alternator (generator) is provided instead of the DC/DC 11. The DC/DC 11 charges the PbB 12, supplies electric power to the first load 101 and the general load 102, supplies electric power to the second load 103, and charges the second power supply 20 to be described later.

The power supply control device 1 includes the second power supply 20, an inter-system switch 41, a battery switch 42, a controller 3, a first voltage sensor 51, and a second voltage sensor 52. The second power supply 20 is a backup power supply when the first power supply 10 cannot supply the electric power. The second power supply 20 includes a lithium-ion battery (hereinafter, referred to as "LiB 21"). A battery of the second power supply 20 may be any secondary battery other than the LiB 21.

The inter-system switch 41 is provided in an inter-system line 130 that connects the first system 110 and the second system 120. The inter-system switch 41 is a switch capable of connecting and cutting off the first system 110 and the second system 120.

The inter-system switch 41 may be a DC/DC converter. In this case, the DC/DC converter is controlled by the controller 3. The DC/DC converter electrically connects the first system 110 and the second system 120 by starting an operation. The DC/DC converter interrupts the electrical connection between the first system 110 and the second system 120 by stopping the operation.

The inter-system switch 41 is an example of a connection device provided in the inter-system line 130. The battery switch 42 is a switch that connects the second power supply 20 to the second system 120. In the following description, connecting the inter-system switch 41 means electrically connecting, that is, conducting the first system 110 and the second system 120 to each other. Cutting off the inter-system switch 41 means cutting off, that is, interrupting the electrical connection between the first system 110 and the second system 120.

The first voltage sensor 51 is provided in the first system 110. The first voltage sensor 51 detects a voltage of the first system 110. The first voltage sensor 51 outputs a detection result to the controller 3. The second voltage sensor 52 is provided in the second system 120. The second voltage sensor 52 detects a voltage of the second system 120. The second voltage sensor 52 outputs a detection result to the controller 3.

The controller 3 includes a microcomputer including a central processing unit (CPU), a read only memory (ROM), a random access memory (RAM), and the like, and various circuits. The controller 3 may be implemented by hardware such as an application specific integrated circuit (ASIC) or a field programmable gate array (FPGA).

The controller 3 controls an operation of the power supply control device 1 by the CPU executing a program stored in the ROM by using the RAM as a work area. The controller 3 controls the inter-system switch 41 and the battery switch 42.

The controller 3 detects a ground fault in the first system 110 or the second system 120 based on detection results input from the first voltage sensor 51 and the second voltage sensor 52. A specific configuration and operation of the controller 3 will be described later with reference to FIGS. 5 and 6.

When a ground fault of the first system 110 or the second system 120 is detected, the controller 3 notifies the autonomous driving control device 100 of the detection. When a ground fault of the first system 110 or the second system 120 is detected, the controller 3 outputs, to the autonomous driving control device 100, an autonomous driving prohibition signal indicating that the autonomous driving is not available. When a ground fault of the first system 110 or the second system 120 is not detected, the controller 3 outputs, to the autonomous driving control device 100, an autonomous driving permission signal indicating that the autonomous driving is available.

2. Normal Operation of Power Supply Control Device

In a normal state where no ground fault occurs in the first system 110 and the second system 120, the controller 3 controls the inter-system switch 41 and the battery switch 42 as illustrated in FIG. 1. Specifically, the controller 3 disconnects the battery switch 42, conducts the inter-system switch 41, and supplies the electric power from the first power supply 10 to the first load 101, the general load 102, and the second load 103.

In the normal state where no ground fault occurs, the controller 3 outputs the autonomous driving permission signal to the autonomous driving control device 100. Hereinafter, conducting the inter-system switch 41 and the battery switch 42 may be referred to as turning on, and disconnecting the inter-system switch 41 and the battery switch 42 may be referred to as turning off.

3. Operation of Power Supply Control Device when Ground Fault Occurs

Next, an operation of the power supply control device 1 when a ground fault occurs will be described with reference to FIGS. 2 to 4. The controller 3 detects an occurrence of a power supply failure by comparing a parameter related to the failure of the first system 110 or the second system 120 with a threshold.

Here, a case where the parameter related to the failure of the first system 110 is a first system voltage V1 and the parameter related to the failure of the second system 120 is a second system voltage V2 will be described. The parameter related to the failure of the first system 110 may be current flowing through the first system 110 or current flowing through the second system 120. In this case, when the current flowing through the first system 110 or the current flowing through the second system 120 exceeds an overcurrent threshold, the controller 3 detects an occurrence of a ground fault.

Figure 2:
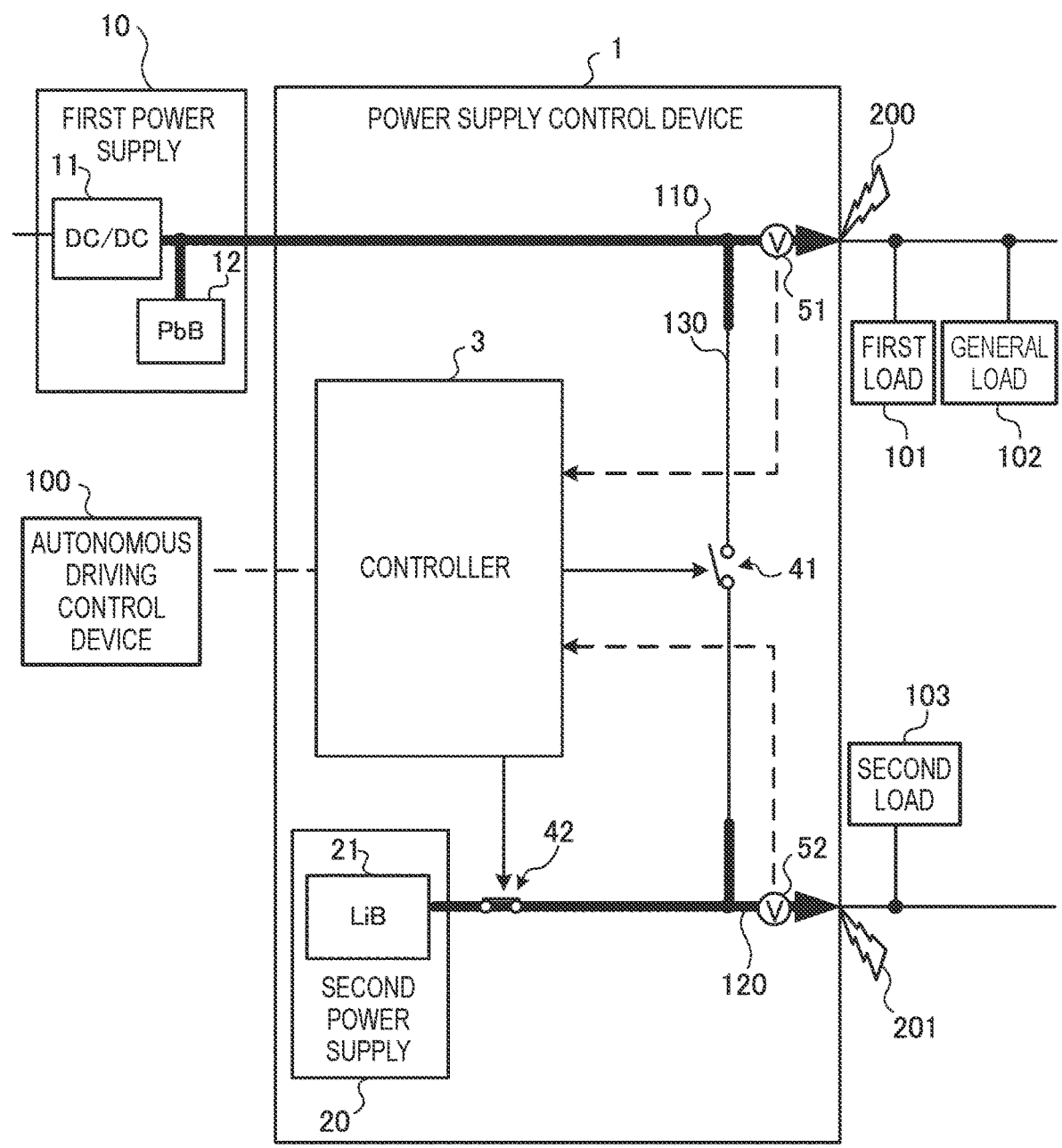
FIG. 2 is a diagram illustrating the configuration and the operation of the power supply control device according to the first embodiment.

As illustrated in FIG. 2, in the power supply control device 1, when a ground fault 200 occurs in the first system 110, or when a ground fault 201 occurs in the second system 120, overcurrent flows toward a ground fault point. Therefore, the voltages detected by the first voltage sensor 51 and the second voltage sensor 52 are equal to or smaller than a ground fault threshold.

Hereinafter, the voltage of the first system 110 detected by the first voltage sensor 51 will be referred to as the first system voltage V1. The voltage of the second system 120 detected by the second voltage sensor 52 is referred to as the second system voltage V2.

For example, when the second system voltage V2 is equal to or smaller than the ground fault threshold, the controller 3 temporarily determines that the ground fault 200 or the ground fault 201 occurs in the first system 110 or the second system 120. Thereafter, the controller 3 outputs the autonomous driving prohibition signal to the autonomous driving control device 100.

In a case where it is temporarily determined that the ground fault 200 or the ground fault 201 occurs, the controller 3 turns off the inter-system switch 41 and turns on the battery switch 42. Accordingly, when the connection between the first system 110 and the second system 120 is cut off, electric power is supplied from the first power supply 10 to the first system 110, and electric power is supplied from the second power supply 20 to the second system 120. Hereinafter, the disconnection of the inter-system switch 41 based on a result of the temporary determination is also referred to as pre-disconnection.

When at least one of the first system voltage V1 and the second system voltage V2 is equal to or smaller than the ground fault threshold, the controller 3 may temporarily determine that a ground fault occurs in the first system 110 or the second system 120. After temporarily determining that a ground fault occurs in the first system 110 or the second system 120, the controller 3 performs the confirmation of the ground fault.

When the first system voltage V1 is equal to or smaller than the ground fault threshold continuously for a predetermined period or longer and the second system voltage V2 returns to be equal to or larger than a normal threshold that is larger than the ground fault threshold continuously for a predetermined period or longer after the pre-disconnection, the controller 3 confirms that the second system 120 is normal and the ground fault 200 occurs in the first system 110. The predetermined period here is, for example, 100 ms. The predetermined period is not limited to 100 ms.

Figure 3:
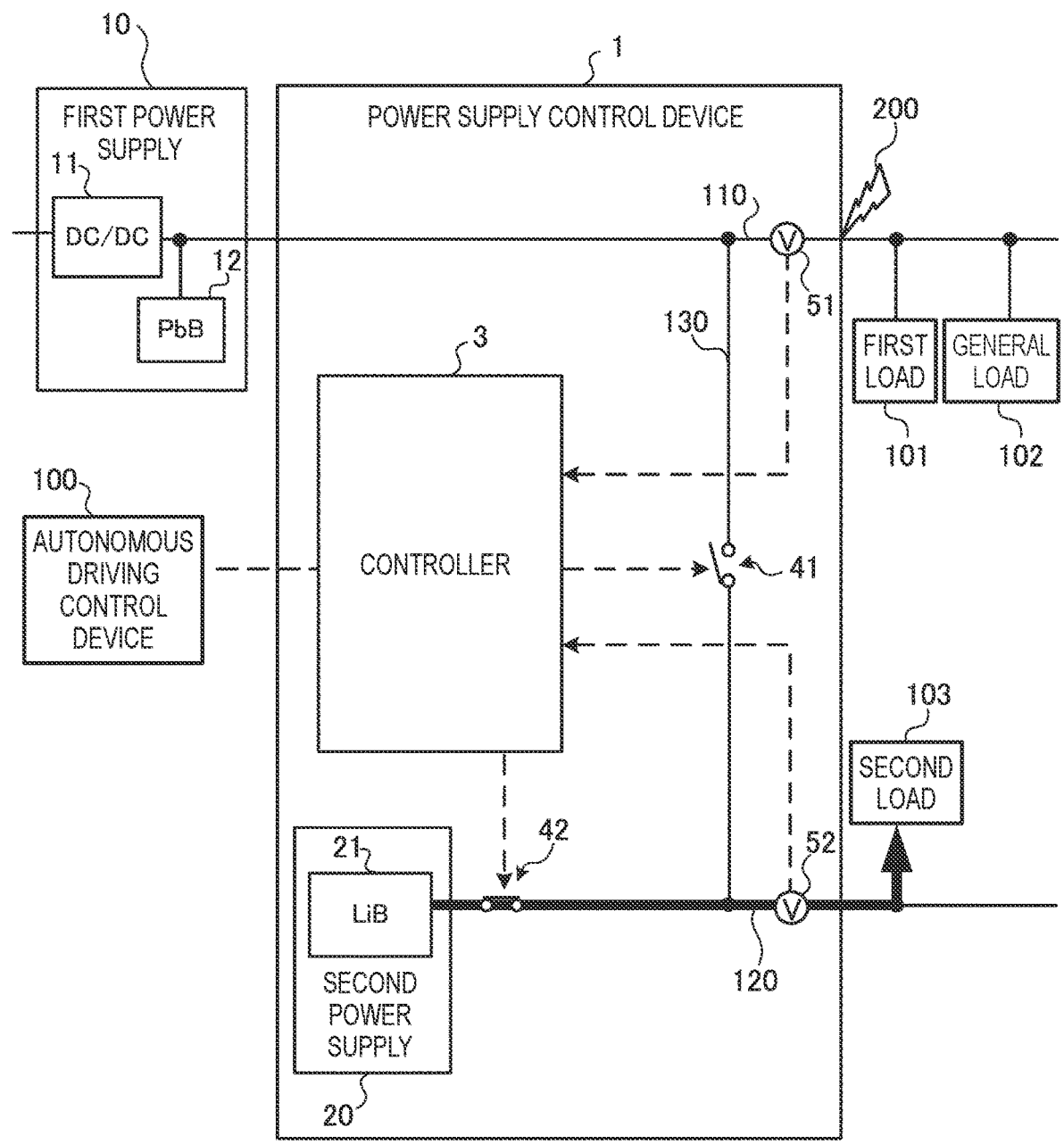
FIG. 3 is a diagram illustrating the configuration and the operation of the power supply control device according to the first embodiment.

In a case where it is confirmed that the ground fault 200 occurs in the first system 110, as illustrated in FIG. 3, the controller 3 supplies electric power from the second power supply 20 to the second load 103, and notifies the autonomous driving control device 100 of this fact. Accordingly, the autonomous driving control device 100 may operate the second load 103 with the electric power supplied from the second power supply 20 to cause the vehicle to retreat to a safe place and stop.

When the first system voltage V1 returns to be equal to or larger than the normal threshold continuously for a predetermined period or longer and the second system voltage V2 is equal to or smaller than the ground fault threshold continuously for a predetermined period or longer after the pre-disconnection, the controller 3 confirms that the first system 110 is normal and that the ground fault 201 occurs in the second system 120.

Figure 4:
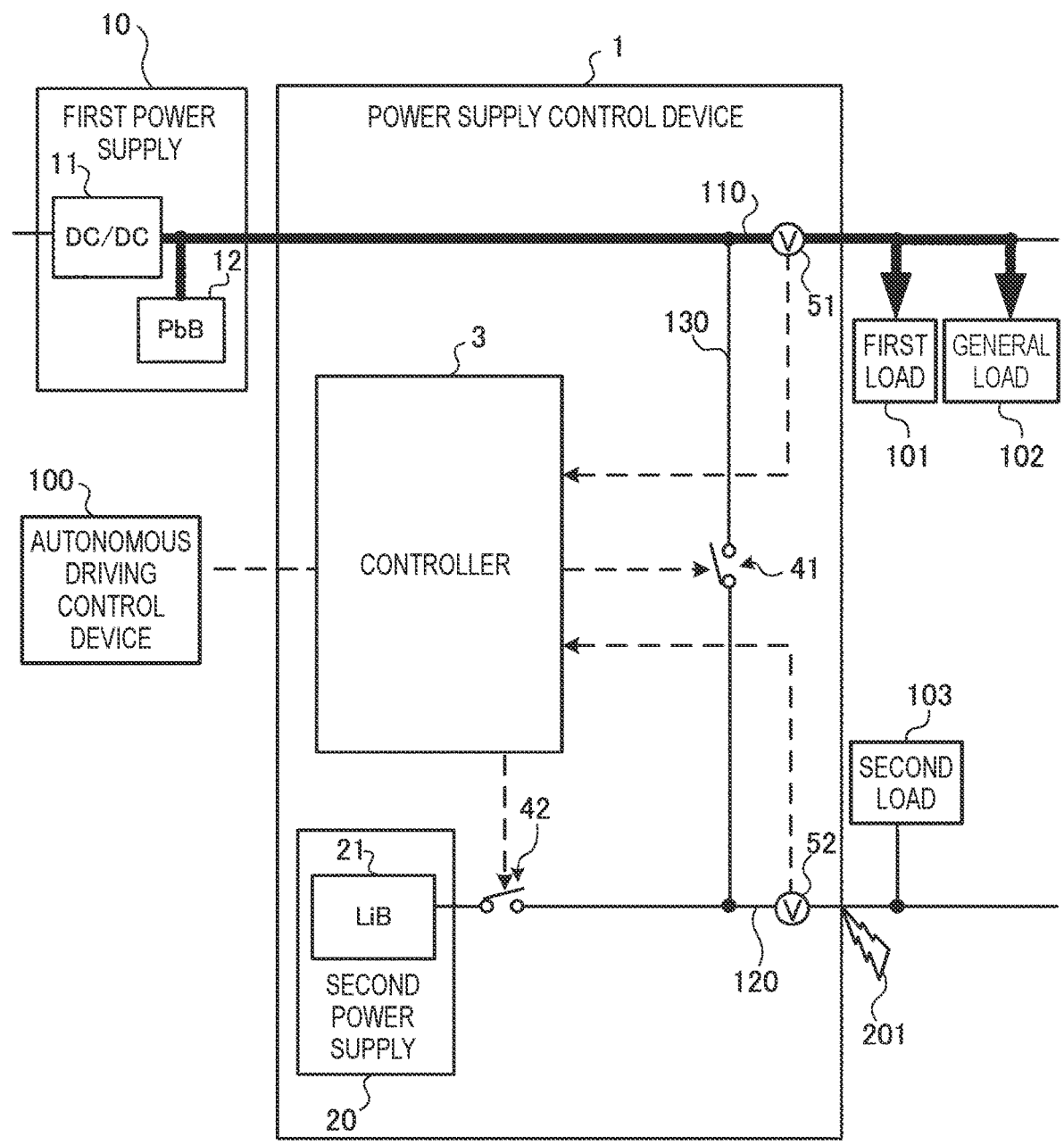
FIG. 4 is a diagram illustrating the configuration and the operation of the power supply control device according to the first embodiment.

In a case where it is confirmed that the ground fault 201 occurs in the second system 120, as illustrated in FIG. 4, the controller 3 turns off the battery switch 42 and supplies the electric power from the first power supply 10 to the first load 101 and the general load 102. The controller 3 notifies the autonomous driving control device 100 of this fact. Accordingly, the autonomous driving control device 100 may operate the first load 101 with the electric power supplied from the first power supply 10 to cause the vehicle to retreat to a safe place and stop.

When both the first system voltage V1 and the second system voltage V2 return to be equal to or larger than the normal threshold continuously for a predetermined period or longer after the pre-disconnection, the controller 3 confirms that the voltages only temporarily decreased and neither the ground fault 200 nor 201 occurs, that is, both of the first system 110 and the second system 120 are normal. In this case, the controller 3 turns off the battery switch 42 from a pre-disconnection state illustrated in FIG. 2, turns on the inter-system switch 41, and returns to a normal operation state illustrated in FIG. 1. Accordingly, the controller 3 may prevent an amount of electric power stored in the second power supply 20 from decreasing.

However, in the power supply control device 1, the first system voltage V1 and the second system voltage V2 may vibrate due to noise or the like. In this case, when the controller 3 detects a ground fault every time the second system voltage V2 vibrates due to noise or the like and repeats the pre-disconnection, the electric power necessary for the fail-safe control is lost while the inter-system switch 41 is conducted.

Therefore, the controller 3 has a configuration capable of preventing a decrease in an amount of stored electric power for use in the fail-safe control. Hereinafter, the configuration and the operation of the controller 3 according to the first embodiment will be described.

4. Configuration and Operation of Controller

Figure 5:
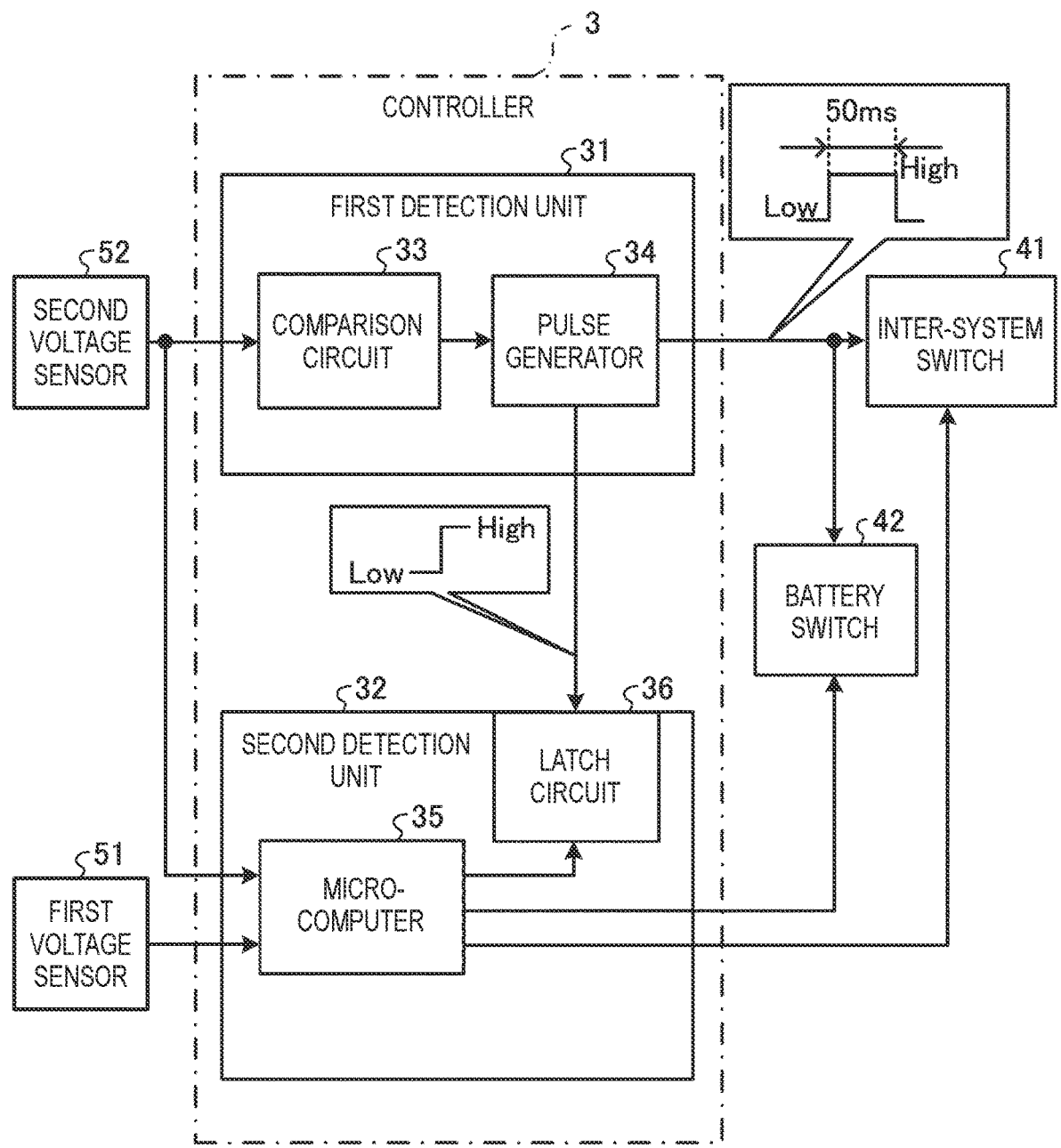
FIG. 5 is a diagram illustrating a configuration and an operation of a controller according to the first embodiment.

FIG. 5 is a diagram illustrating a configuration and an operation of the controller 3 according to the first embodiment. As illustrated in FIG. 5, the controller 3 includes a first detection unit 31 and a second detection unit 32. The first detection unit 31 includes a comparison circuit 33 and a pulse generator 34. The second detection unit 32 includes a microcomputer 35 and a latch circuit 36.

The comparison circuit 33 compares the second system voltage V2 input from the second voltage sensor 52 with the ground fault threshold. When the second system voltage V2 is equal to or smaller than the ground fault threshold, the comparison circuit 33 outputs a detection signal indicating the occurrence of the power supply failure to the pulse generator 34.

The pulse generator 34 is implemented by a monostable multivibrator. When the detection signal is input from the comparison circuit 33, the pulse generator 34 outputs a pulse signal having a predetermined pulse width to the inter-system switch 41 and the battery switch 42. The predetermined pulse width is, for example, 50 ms. The predetermined pulse width is not limited to 50 ms.

Specifically, the predetermined pulse width may be a pulse width other than 50 ms as long as the predetermined pulse width is longer than a cycle of vibration of the first system voltage V1 or the second system voltage V2 assumed to be generated due to noise.

Accordingly, the inter-system switch 41 may maintain an off state even when the second system voltage V2 vibrates and exceeds the ground fault threshold during a period in which the input pulse signal is High. The battery switch 42 is in an on state during the period in which the input pulse signal is High.

Therefore, when a ground fault actually occurs, the controller 3 does not repeatedly turn off and turn on the inter-system switch 41 during a period of at least 50 ms, and thus decrease in the amount of the electric power stored in the first power supply 10 and the second power supply 20 for use in the fail-safe control may be prevented. As a result, the controller 3 may extend a time for enabling the fail-safe control. Further, the controller 3 may 3 may stably disconnect the inter-system switch 41 without being influenced by the vibration of the second system voltage V2 caused by noise.

The controller 3 detects the voltage drop by the hardware circuit of the comparison circuit 33 and the pulse generator 34, and interrupts the inter-system switch 41. With such a configuration, the inter-system switch 41 may be interrupted immediately in comparison to a case where a ground fault is detected through software when the ground fault actually occurs. An amount of electric power stored in a normal power supply among the first power supply 10 and the second power supply 20 may be prevented from decreasing, accordingly.

The pulse generator 34 also outputs a pulse signal having a predetermined pulse width to the latch circuit 36 of the second detection unit 32. The latch circuit 36 latches the pulse signal input from the pulse generator 34. For example, the latch circuit 36 includes a flag indicating a latch state of the pulse signal. When the pulse signal is received, the latch circuit 36 changes the flag from "0" to "1" at a rising edge from Low to High.

The microcomputer 35 periodically acquires the latch state of the latch circuit 36. For example, the microcomputer 35 acquires the latch state at a cycle of 4 ms. The cycle in which the microcomputer 35 acquires the latch state is not limited to 4 ms.

When the microcomputer 35 detects that the pulse signal is latched by the latch circuit 36, the microcomputer 35 clears the latch state of the latch circuit 36 and takes over the control of the inter-system switch 41 and the battery switch 42 by the first detection unit 31. Specifically, the microcomputer 35 continues turning off the inter-system switch 41 and continues turning on the battery switch 42. After that, the microcomputer 35 clears the latch state of the latch circuit 36.

Thereafter, the microcomputer 35 executes a confirmation process for confirming an abnormal system in which a power supply failure occurs among the first system 110 and the second system 120. Specifically, the microcomputer 35 compares the first system voltage V1 input from the first voltage sensor 51 and the second system voltage V2 input from the second voltage sensor 52 with the ground fault threshold to execute the confirmation process.

When the first system voltage V1 is equal to or smaller than the ground fault threshold continuously for a predetermined period or longer and the second system voltage V2 returns to a value equal to or larger than the normal threshold continuously for a predetermined period or longer, the microcomputer 35 confirms that the ground fault 200 occurs in the first system 110. In this case, the microcomputer 35 continues turning off the inter-system switch 41 and turning on the battery switch 42.

When the first system voltage V1 returns to the value equal to or larger than the normal threshold continuously for a predetermined period or longer and the second system voltage V2 is equal to or smaller than the ground fault threshold continuously for a predetermined period or longer, the microcomputer 35 confirms that the ground fault 201 occurs in the second system 120. In this case, the microcomputer 35 turns off the battery switch 42 while continuing turning off the inter-system switch 41.

When the first system voltage V1 and the second system voltage V2 return to values equal to or larger than the normal threshold continuously for a predetermined period or longer after the pre-disconnection, the microcomputer 35 confirms that the voltages only temporarily decreased and neither the ground fault 200 nor 201 occurs. In this case, the microcomputer 35 turns off the battery switch 42 from a pre-disconnection state illustrated in FIG. 2, turns on the inter-system switch 41, and returns to a normal operation state illustrated in FIG. 1.

As described above, when the microcomputer 35 detects that the pulse signal is input to the latch circuit 36, the microcomputer 35 turns off the inter-system switch 41 during a period until an abnormal system is determined at least. Here, if a control of turning off the inter-system switch 41 based on the pulse signal by the first detection unit 31 and a control of releasing off and turning on the inter-system switch 41 are both realized, a circuit configuration becomes complicated.

On the other hand, in the controller 3, the first detection unit 31, which is hardware, turns off the inter-system switch 41 for a predetermined period (for example, 50 ms) defined by the hardware. Thereafter, the second detection unit 32 operating by the software may release the off state of the inter-system switch 41 and turn on the inter-system switch 41. Therefore, according to the controller 3, it is possible to simplify the configuration for releasing off the inter-system switch 41.

The microcomputer 35 periodically detects an occurrence of a power supply failure at a first cycle based on a parameter of the first system 110 or the second system 120. The microcomputer 35 periodically acquires the latch state of the latch circuit 36 at a second cycle shorter than the first cycle.

Specifically, the microcomputer 35 detects an occurrence of a power supply failure by performing analog/digital (AD) conversion on the first system voltage V1 and the second system voltage V2 and comparing the first system voltage V1 and the second system voltage V2 with the ground fault threshold. Therefore, the microcomputer 35 requires the first cycle longer than the second cycle to detect a power supply failure.

On the other hand, for acquiring the latch state of the latch circuit 36, the microcomputer 35 may acquire a latch state, for example, at the second cycle which is a cycle of a predetermined operation clock, that is, a cycle shorter than the first cycle.

Therefore, the microcomputer 35 may start the confirmation of the failed system earlier by checking the latch state of the latch circuit 36 before detecting the occurrence of the power supply failure by the microcomputer 35. That is, the microcomputer 35 may quickly confirm in which system of the first system 110 and the second system 120 the power supply failure occurs or no power supply failure occurs in any of the systems.

Accordingly, if a power supply failure does not occur in any of the systems, the controller 3 may return to a state where autonomous driving is enabled by turning on the inter-system switch 41 and turning off the battery switch 42 immediately.

When a power supply failure occurs in the second system 120, the controller 3 may 3 may prevent the amount of the electric power stored in the second power supply 20 from decreasing by turning off the battery switch 42 immediately.

5. Process Executed by Controller According to First Embodiment

Figure 6:
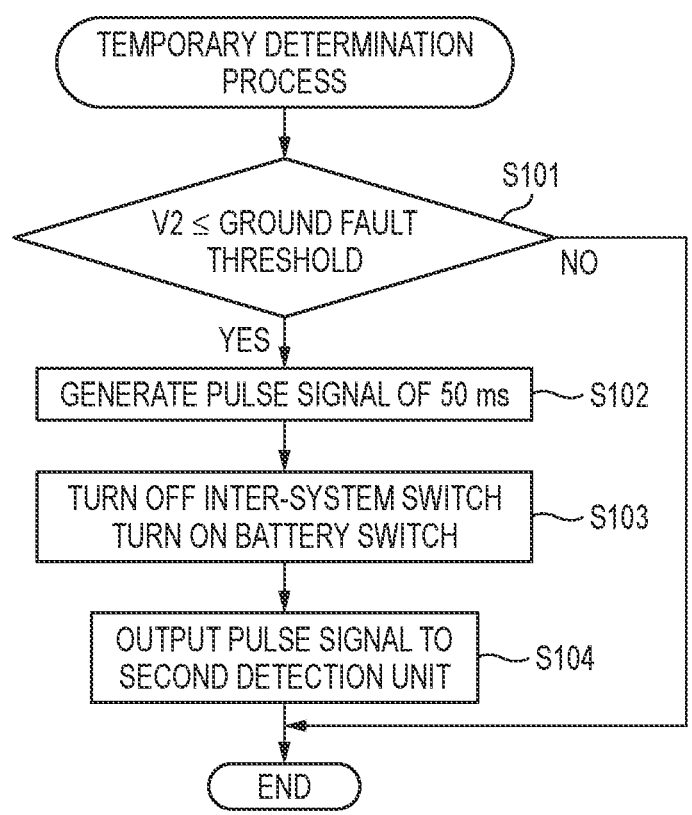
FIG. 6 is a flowchart illustrating an example of a temporary determination process executed by the controller according to the first embodiment.
Figure 7:
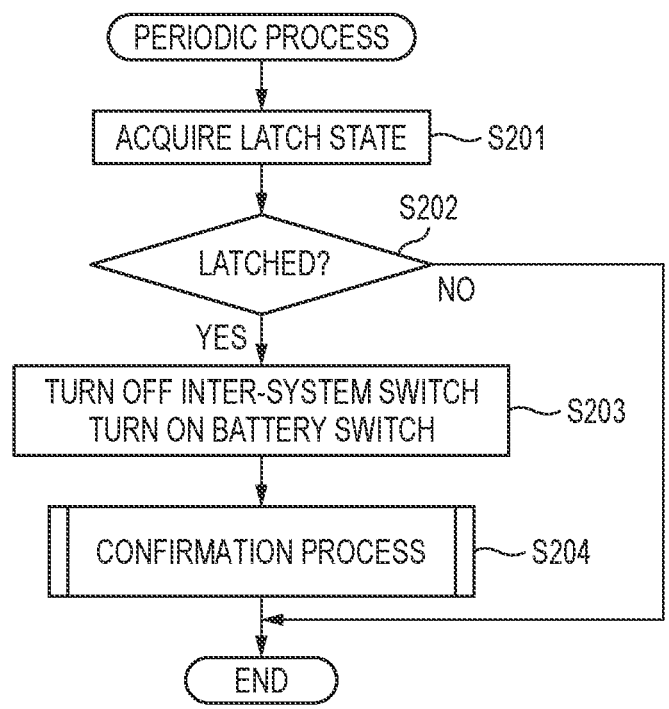
FIG. 7 is a flowchart illustrating an example of a periodic process executed by the controller according to the first embodiment.
Figure 8:
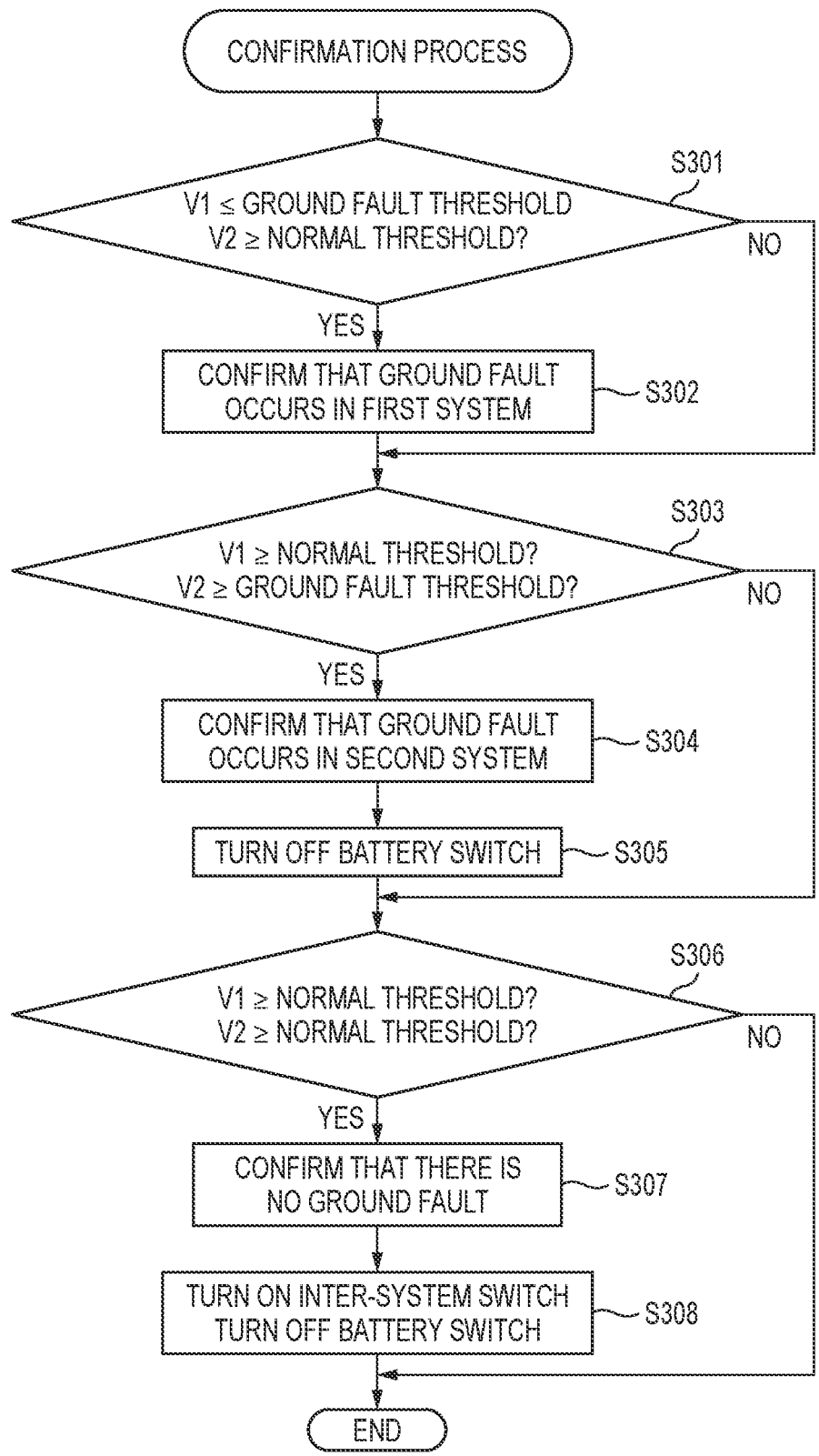
FIG. 8 is a flowchart illustrating an example of a confirmation process executed by the controller according to the first embodiment.

Next, a process executed by the controller 3 will be described with reference to FIGS. 6 to 8. FIG. 6 is a flowchart illustrating an example of a temporary determination process executed by the controller 3 according to the first embodiment. FIG. 7 is a flowchart illustrating an example of a periodic process executed by the controller 3 according to the first embodiment. FIG. 8 is a flowchart illustrating an example of a confirmation process executed by the controller 3 according to the first embodiment.

First, an example of a temporary determination process executed by the first detection unit 31 will be described with reference to FIG. 6. Although the temporary determination process executed by the first detection unit 31 is executed by hardware, the description will be made in the form of a flowchart for convenience in order to describe the process content.

As illustrated in FIG. 6, the first detection unit 31 compares the second system voltage V2 with the ground fault threshold, and determines whether the second system voltage V2 is equal to or smaller than the ground fault threshold (step S101). In response to determining that the second system voltage V2 is not equal to or smaller than the ground fault threshold (step S101, No), the first detection unit 31 ends the process and starts the process from step S101 again.

In a case where it is determined that the second system voltage V2 is equal to or smaller than the ground fault threshold (step S101, Yes), the first detection unit 31 generates a pulse signal of 50 ms (step S102), turns off the inter-system switch 41, and turns on the battery switch 42 while the pulse signal is High (step S103). Subsequently, the first detection unit 31 outputs the pulse signal to the second detection unit 32, notifies the occurrence of the power supply failure (step S104), and ends the process.

Next, an example of a periodic process executed by the second detection unit 32 will be described with reference to FIG. 7. The microcomputer 35 of the second detection unit 32 periodically executes the periodic process at a cycle of, for example, 4 ms.

As illustrated in FIG. 7, when the periodic process is started, the microcomputer 35 first acquires the latch state of the latch circuit 36 (step S201). The microcomputer 35 determines whether the pulse signal is latched by the latch circuit 36 (step S202).

For example, when the flag is "1", the microcomputer 35 determines that the pulse signal is latched. When the flag is "0", the microcomputer 35 determines that the pulse signal is not latched.

In a case where it is determined that the pulse signal is not latched (step S202, No), the microcomputer 35 ends the periodic process. In a case where it is determined that the pulse signal is latched (step S202, Yes), the microcomputer 35 turns off the inter-system switch 41 and turns on the battery switch 42 (step S203). Thereafter, the microcomputer 35 executes the confirmation process (step S204) and ends the periodic process.

Next, an example of the confirmation process will be described with reference to FIG. 8. As illustrated in FIG. 8, when the confirmation process is started, the microcomputer 35 first compares the first system voltage V1 and the second system voltage V2 with the ground fault threshold and the normal threshold.

Specifically, the microcomputer 35 determines whether the first system voltage V1 is equal to or smaller than the ground fault threshold continuously for the predetermined period or longer and that the second system voltage V2 returns to a value equal to or larger than the normal threshold continuously for the predetermined period (step S301).

In a case where it is determined that the first system voltage V1 is not equal to or smaller than the ground fault threshold continuously for the predetermined period or longer the second system voltage V2 does not return to a value equal to or larger than the normal threshold continuously for the predetermined period (step S301, No), the microcomputer 35 moves the process to step S303.

In a case where it is determined that the first system voltage V1 is equal to or smaller than the ground fault threshold continuously for the predetermined period or longer and that the second system voltage V2 is equal to or larger than the normal threshold continuously for the predetermined period or longer (step S301, Yes), the microcomputer 35 moves the process to step S302. In step S302, the microcomputer 35 confirms that the ground fault 200 occurs in the first system 110. Thus, the fail-safe control is executed by the second system 120.

Subsequently, the microcomputer 35 determines whether the first system voltage V1 returns to a value is equal to or larger than the normal threshold continuously for a predetermined period or longer, and whether the second system voltage V2 is equal to or smaller than the ground fault threshold continuously for a predetermined period or longer (step S303).

In a case where it is determined that the first system voltage V1 does not return to a value equal to or larger than the normal threshold continuously for the predetermined period or longer or that the second system voltage V2 is not equal to or smaller than the ground fault threshold continuously for the predetermined period or longer (step S303, No), the microcomputer 35 moves the process to step S306.

In a case where it is determined that the first system voltage V1 returns to a value equal to or larger than the normal threshold continuously for the predetermined period or longer and that the second system voltage V2 is equal to or smaller than the ground fault threshold continuously for the predetermined period or longer (step S303, Yew), the microcomputer 35 moves the process to step S304.

In step S304, the microcomputer 35 determines that the ground fault 201 occurs in the second system 120. Thereafter, the microcomputer 35 turns off the battery switch 42 (step S305). Accordingly, the fail-safe control is executed by the first system 110.

Thereafter, the microcomputer 35 determines whether the first system voltage V1 and the second system voltage V2 return to values equal to or larger than the normal threshold continuously for a predetermined period or longer (step S306). In a case where it is determined that the first system voltage V1 and the second system voltage V2 do not return to the value equal to or larger than the normal threshold continuously for the predetermined period or longer (step S306, No), the microcomputer 35 ends the confirmation process and starts the confirmation process again.

In a case where it is determined that the first system voltage V1 and the second system voltage V2 return to values equal to or larger than the normal threshold continuously for the predetermined period or longer (step S306, Yes), the microcomputer 35 confirms that there is no ground fault (step S307). The microcomputer 35 turns on the inter-system switch 41 and turns off the battery switch 42 (step S308), and ends the confirmation process. Accordingly, the controller 3 returns to the normal control illustrated in FIG. 1.

6. Configuration and Operation of Controller According to Second Embodiment

Figure 9:
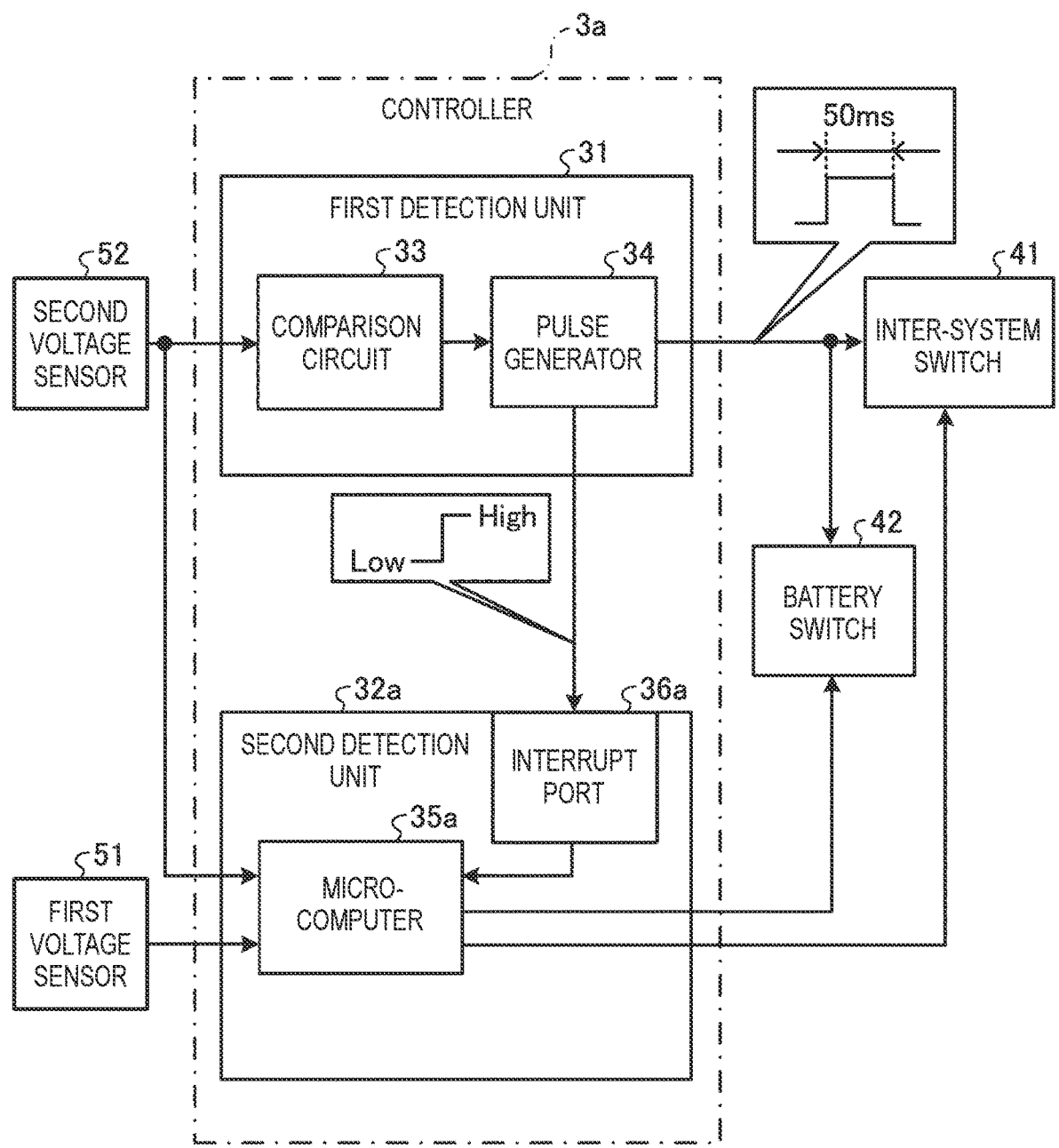
FIG. 9 is a diagram illustrating a configuration and an operation of a controller according to a second embodiment.

The configuration of the controller 3 illustrated in FIG. 5 is an example and may be modified. Next, a controller 3a according to the second embodiment will be described with reference to FIG. 9. FIG. 9 is a diagram illustrating a configuration and an operation of the controller 3a according to the modification of the second embodiment.

As illustrated in FIG. 9, the second detection unit 32a of the controller 3a includes an interrupt port 36a instead of the latch circuit 36 illustrated in FIG. 5. The configuration and the operation of the first detection unit 31 are the same as those of the first detection unit 31 illustrated in FIG. 5.

When a pulse signal is input from the pulse generator 34, the interrupt port 36a immediately outputs an interrupt signal to the microcomputer 35a. For example, the interrupt port 36a outputs an interrupt signal to the microcomputer 35a at a timing when the input pulse signal switches from Low to High.

When the interrupt signal is received from the interrupt port 36a, the microcomputer 35a determines an abnormal system in which a power supply failure occurs among the first system 110 and the second system 120 by an interrupt process.

Accordingly, when the pulse signal is received from the pulse generator 34 to the interrupt port 36a, the determination of the abnormal system is immediately started, and thus the microcomputer 35a may start the confirmation of the abnormal system earlier than a case of executing the periodic process described above.

7. Process Executed by Controller According to Second Embodiment

Figure 10:
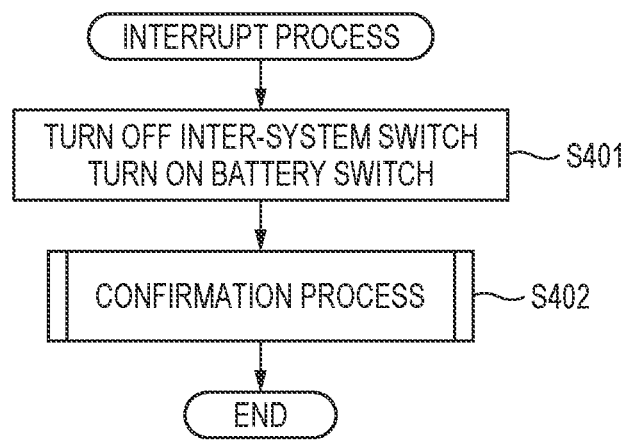
FIG. 10 is a flowchart illustrating an example of an interrupt process executed by the controller according to the second embodiment.

Next, a process executed by the controller 3a according to the second embodiment will be described with reference to FIG. 10. FIG. 10 is a flowchart illustrating an example of an interrupt process executed by the controller 3a according to the second embodiment. When the interrupt signal according to the pulse signal is received from the interrupt port 36a, the microcomputer 35a starts the interrupt process illustrated in FIG. 10.

As illustrated in FIG. 10, when the interrupt process is started, the microcomputer 35a immediately turns off the inter-system switch 41 and turns on the battery switch 42 (step S401). Thereafter, the microcomputer 35a executes the confirmation process (step S402) and ends the interrupt process. The microcomputer 35a executes the same process as the confirmation process illustrated in FIG. 8 in the confirmation process of step S402.

8. Configuration and Operation of Controller According to Third Embodiment

Figure 11:
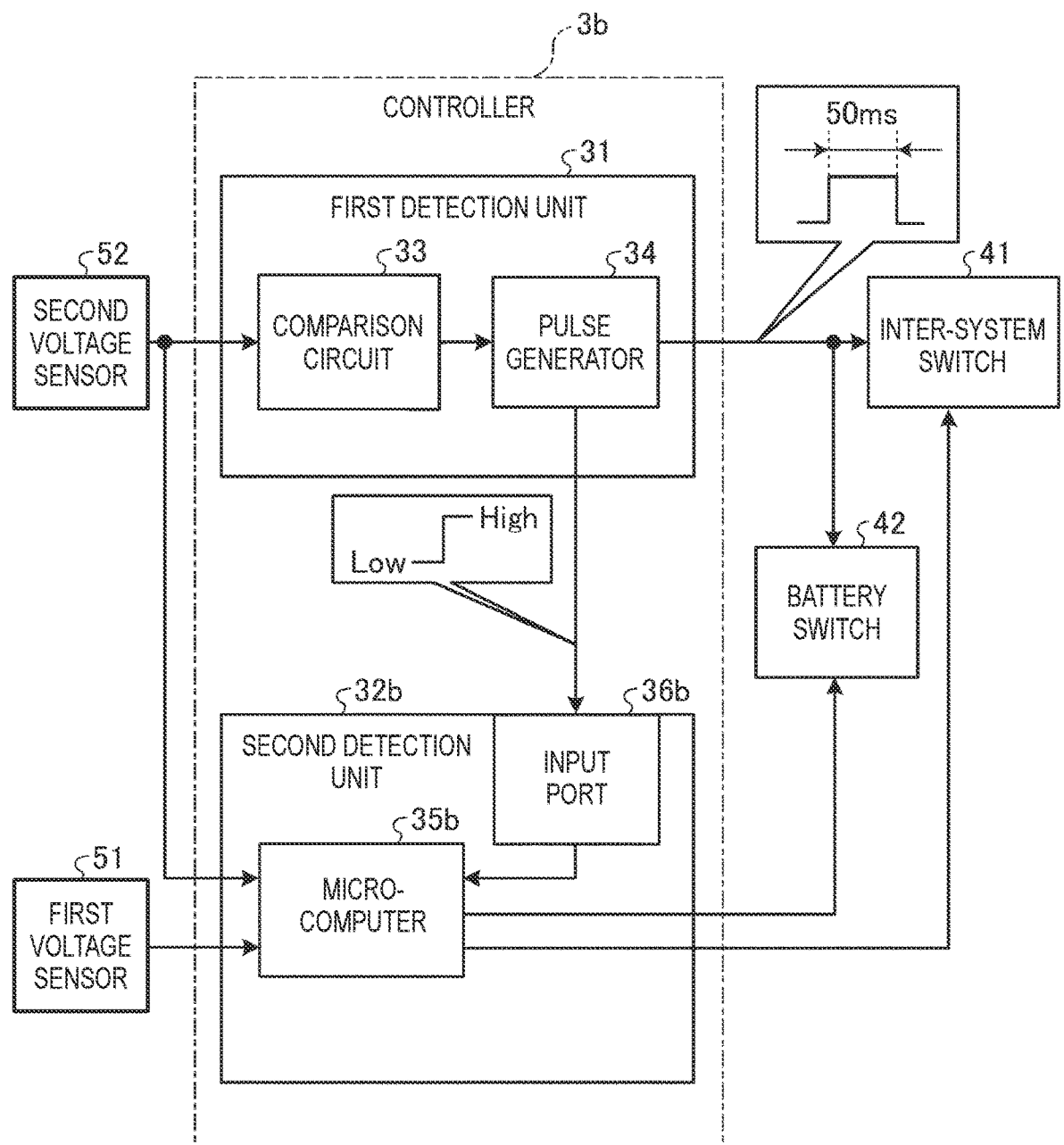
FIG. 11 is a diagram illustrating a configuration and an operation of a controller according to a third embodiment.

Next, a controller 3b according to the third embodiment will be described with reference to FIG. 11. FIG. 11 is a diagram illustrating a configuration and an operation of the controller 3b according to the third embodiment.

As illustrated in FIG. 11, the second detection unit 32b of the controller 3b includes an interrupt port 36b instead of the latch circuit 36 illustrated in FIG. 5. The configuration and the operation of the first detection unit 31 are the same as those of the first detection unit 31 illustrated in FIG. 5.

In a case where an occurrence of a power supply failure is detected by the first detection unit 31, pulse signal that is maintained High for, for examples, 50 ms, is input to the input port 36b.

When it is detected that a pulse signal is input to the input port 36b, the microcomputer 35b determines an abnormal system in which a power supply failure occurs among the first system 110 and the second system 120.

The pulse signal is received at the input port 36b, and the microcomputer 35b periodically (for example, a cycle of 4 ms) acquires the state of the input port 36b. When the microcomputer 35b detects the pulse signal of High is input, the microcomputer 35b determine the first detection unit 31 detects a power supply failure and confirms an abnormal system in which a power supply failure occurs among the first system 110 and the second system 120.

The microcomputer 35b periodically detects an occurrence of the power supply failure in the first system 110 or the second system at the first cycle. The microcomputer 35b periodically acquires a state of the input port 36b at the second cycle that is shorter than the first cycle.

Specifically, the microcomputer 35 detects an occurrence of a power supply failure by performing analog/digital (AD) conversion on the first system voltage V1 and the second system voltage V2 and comparing the first system voltage V1 and the second system voltage V2 with the ground fault threshold. Therefore, the microcomputer 35 requires the first cycle longer than the second cycle to detect a power supply failure.

On the other hand, for acquiring the state of the input port 36b, the microcomputer 35b may acquire the state of the input port 36b, for example, at the second cycle (for example, a cycle of 4 ms) which is a cycle of a predetermined operation clock, that is, at a cycle shorter than the first cycle.

Therefore, the microcomputer 35b may start the confirmation of the failed system earlier by checking the state of the input port 36b before detecting the occurrence of the power supply failure by the microcomputer 35b. That is, the microcomputer 35b may quickly confirm in which system of the first system 110 and the second system 120 the power supply failure occurs or no power supply failure occurs in any of the systems.

In a case where there is no power supply failure in any of the systems, the controller 3b quickly turns on the inter system switch 41 to return to the state in which automatic driving is available.

Further, in a case where a power supply failure occurs in the second system 120, the controller 3b quickly turns off the battery switch 42 to prevent a decrease in an amount of electric power stored in the second battery 20.

Further, since the cycle (4 ms) at which the state of the input port 36b (the input state of the pulse signal) is acquired is short enough which reference to the ON time (50 ms) during which the pulse signal is High, the microcomputer 35b may detect that the pulse signal is output without the latch circuit 36, which is explained in the first embodiment, and may reliably detect abnormality (pre-interruption).

9. Process Executed by Controller According to Third Embodiment

Figure 12:
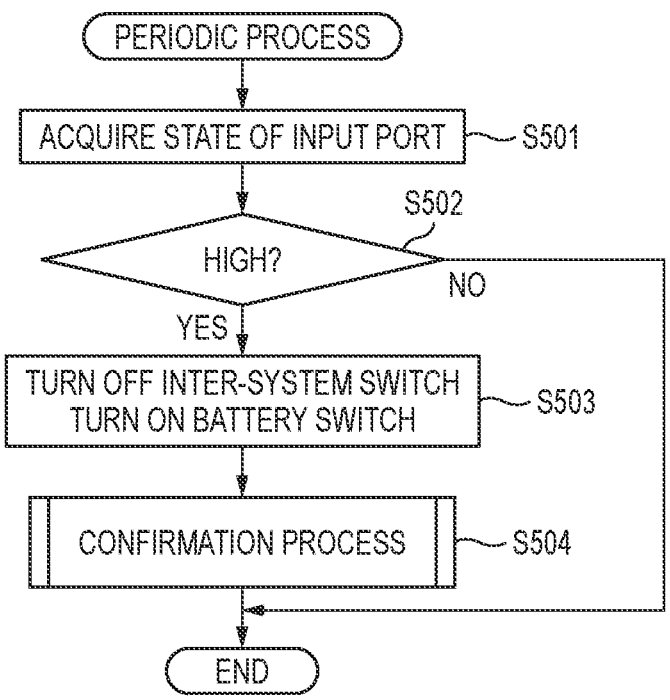
FIG. 12 is a flowchart illustrating an example of a periodic process executed by the controller according to the third embodiment.

Next, a process executed by the controller 3b according to the third embodiment will be described with reference to FIG. 12. FIG. 12 is a flowchart illustrating an example of an interrupt process executed by the controller 3b according to the second embodiment. The microcomputer 35b periodically executes periodic process illustrated in FIG. 12, for example, at a period of 4 ms.

As illustrated in FIG. 12, when starting the periodic process, the microcomputer 3b first acquires a state of the input port 36b (step S501). The microcomputer 35b then determines whether the state of the pulse signal input to the input port 36b is High or not (step S502).

When it is determined that the state of the pulse signal is not High, that is, the state of the pulse signal is Low (step S502; NO), the microcomputer 35b ends the periodic process. When it is determined that the state of the pulse signal is High (step S502; YES), the microcomputer 35b turns off the inter-system switch 41 and turns on the battery switch 42 (step S503). Accordingly, the microcomputer 35b takes over the control of the inter-system switch 41 and the battery switch 42 that has been controlled by the pulse generator 34 of the first detection unit 31.

The microcomputer 35b may determine that the step S502 is Yes in case of detecting that the state of the pulse signal is High multiple times successively. Misdetection by the microcomputer 35b due to the noise input to the input port 36b may be prevented, accordingly.

Thereafter, the microcomputer 35b executes the confirmation process (step S504) and ends the periodic process. The microcomputer 35b executes the same process as the confirmation process illustrated in FIG. 8 in the confirmation process of step S504.

10. Appendix

As an appendix, the features of the present disclosure are illustrated below.

(1) A power supply control device including:
   a controller configured to control a connection device provided in an inter-system line connecting a first system and a second system, the first system being configured to supply electric power from a first power supply to a first load, the second system being configured to supply electric power from a second power supply to a second load, in which
   the controller includes:
      a comparison circuit configured to compare a parameter related to a power supply failure of the first system or of the second system with a threshold and to output a detection signal indicating an occurrence of the power supply failure;
      a pulse generator configured to output a pulse signal having a predetermined pulse width in response to receiving the detection signal and to disconnect the connection device to disconnect connection between the first system and the second system during a period in which the pulse signal is output;
      a latch circuit configured to latch the pulse signal; and
      a microcomputer configured to periodically acquire a latch state of the latch circuit and to determine, in response to detecting that the pulse signal is latched, in which of the first system and the second system the power supply failure occurs.

(2) The power supply control device according to (1), in which
   the predetermined pulse width is longer than a cycle of vibration of the parameter assumed to be generated due to noise.

(3) The power supply control device according to (1) or (2), in which
   the microcomputer is configured to, in response to the pulse signal being received by the latch circuit, disconnect the connection device at least during a period until the abnormal system is determined.

(4) The power supply control device according to any one of (1) to (3), in which
   the microcomputer is configured to periodically detect the occurrence of the power supply failure at a first cycle based on the parameter related to the first system or the second system, and periodically acquire the latch state of the latch circuit at a second cycle shorter than the first cycle.

(5) A power supply control device including:
   a controller configured to control a connection device provided in an inter-system line connecting a first system and a second system, the first system being configured to supply electric power from a first power supply to a first load, the second system being configured to supply electric power from a second power supply to a second load, in which
   the controller includes:
      a comparison circuit configured to compare a parameter related to a power supply failure of the first system or of the second system with a threshold and to output a detection signal indicating an occurrence of the power supply failure;
      a pulse generator configured to output a pulse signal having a predetermined pulse width in response to receiving the detection signal and to disconnect the connection device to disconnect a connection between the first system and the second system during a period in which the pulse signal is output; and a microcomputer configured to, in response to the pulse signal being input, determine in which of the first system and the second system the power supply failure occurs by an interrupt process.

(6) The power supply control device according to (5), in which the predetermined pulse width is longer than a cycle of vibration of the parameter assumed to be generated due to noise.

(7) The power supply control device according to (5) or (6), in which the microcomputer is configured to, in response to the pulse signal being input, disconnect the connection device at least during a period until the abnormal system is determined.

(8) A power supply control device including a controller configured to control a connection device provided in an inter-system line connecting a first system and a second system, the first system being configured to supply electric power from a first power supply to a first load, the second system being configured to supply electric power from a second power supply to a second load, in which the controller includes:

a comparison circuit configured to compare a parameter related to a power supply failure of the first system or of the second system with a threshold and to output a detection signal indicating an occurrence of the power supply failure;

a pulse generator configured to output a pulse signal having a predetermined pulse width in response to receiving the detection signal and to disconnect the connection device to disconnect connection between the first system and the second system during a period in which the pulse signal is output;

an input port configured to receive the pulse signal; and a microcomputer configured to periodically acquire a state of the input port and determine, in response to the pulse signal being input to the input port, in which of the first system and the second system the power supply failure occurs.

(9) The power supply control device according to (8), in which the predetermined pulse width is longer than a cycle of vibration of the parameter assumed to be generated due to noise.

(10) The power supply control device according to (8) or (9), in which the microcomputer is configured to, in response to the pulse signal being received by the input port, disconnect the connection device at least during a period until the abnormal system is determined.

(11) The power supply control device according to any one of (8) to (10), in which the microcomputer is configured to periodically detect the occurrence of the power supply failure at a first cycle based on the parameter related to the first system or the second system, and periodically acquire the state of the input port at a second cycle shorter than the first cycle.

(12) The power supply control device according to any one of (8) to (11), in which the microcomputer is configured to periodically acquire the state of the input port at a cycle shorter than the predetermined pulse width.

Further effects and modifications may be easily derived by those skilled in the art. Therefore, broader aspects of the present invention are not limited to the specific details and representative embodiments illustrated and described above. Therefore, various modifications may be made without departing from the spirit or scope of the general inventive concept as defined by the appended claims and equivalents thereof.

What is claimed is:

1. A power supply control device comprising:
a controller configured to control a connection device provided in an inter-system line connecting a first system and a second system, the first system being configured to supply electric power from a first power supply to a first load, the second system being configured to supply electric power from a second power supply to a second load, wherein the controller includes:

a comparison circuit configured to compare a parameter related to a power supply failure of the first system or of the second system with a threshold and to output a detection signal indicating an occurrence of the power supply failure;

a pulse generator configured to output a pulse signal having a predetermined pulse width in response to receiving the detection signal and to disconnect the connection device to disconnect connection between the first system and the second system during a period in which the pulse signal is output;

a latch circuit configured to latch the pulse signal; and a microcomputer configured to periodically acquire a latch state of the latch circuit and to determine, in response to detecting that the pulse signal is latched, in which of the first system and the second system the power supply failure occurs.

2. The power supply control device according to claim 1, wherein the predetermined pulse width is longer than a cycle of vibration of the parameter assumed to be generated due to noise.

3. The power supply control device according to claim 1, wherein the microcomputer is configured to, in response to the pulse signal being received by the latch circuit, disconnect the connection device at least during a period until the abnormal system is determined.

4. The power supply control device according to claim 1, wherein the microcomputer is configured to periodically detect the occurrence of the power supply failure at a first cycle based on the parameter related to the first system or the second system, and periodically acquire the latch state of the latch circuit at a second cycle shorter than the first cycle.

5. A power supply control device comprising:
a controller configured to control a connection device provided in an inter-system line connecting a first system and a second system, the first system being configured to supply electric power from a first power supply to a first load, the second system being configured to supply electric power from a second power supply to a second load, wherein the controller includes:
a comparison circuit configured to compare a parameter related to a power supply failure of the first system or of the second system with a threshold and to output a detection signal indicating an occurrence of the power supply failure;
a pulse generator configured to output a pulse signal having a predetermined pulse width in response to receiving the detection signal and to disconnect the connection device to disconnect a connection between the first system and the second system during a period in which the pulse signal is output; and
a microcomputer configured to, in response to the pulse signal being input, determine in which of the first system and the second system the power supply failure occurs by an interrupt process.

6. The power supply control device according to claim 5, wherein
the predetermined pulse width is longer than a cycle of vibration of the parameter assumed to be generated due to noise.

7. The power supply control device according to claim 5, wherein
the microcomputer is configured to, in response to the pulse signal being input, disconnect the connection device at least during a period until the abnormal system is determined.

8. A power supply control device comprising
a controller configured to control a connection device provided in an inter-system line connecting a first system and a second system, the first system being configured to supply electric power from a first power supply to a first load, the second system being configured to supply electric power from a second power supply to a second load, wherein
the controller includes:
a comparison circuit configured to compare a parameter related to a power supply failure of the first system or of the second system with a threshold and to output a detection signal indicating an occurrence of the power supply failure;
a pulse generator configured to output a pulse signal having a predetermined pulse width in response to receiving the detection signal and to disconnect the connection device to disconnect connection between the first system and the second system during a period in which the pulse signal is output;
an input port configured to receive the pulse signal; and
a microcomputer configured to periodically acquire a state of the input port and determine, in response to the pulse signal being input to the input port, in which of the first system and the second system the power supply failure occurs.

9. The power supply control device according to claim 8, wherein
the predetermined pulse width is longer than a cycle of vibration of the parameter assumed to be generated due to noise.

10. The power supply control device according to claim 8, wherein
the microcomputer is configured to, in response to the pulse signal being received by the input port, disconnect the connection device at least during a period until the abnormal system is determined.

11. The power supply control device according to claim 8, wherein
the microcomputer is configured to periodically detect the occurrence of the power supply failure at a first cycle based on the parameter related to the first system or the second system, and periodically acquire the state of the input port at a second cycle shorter than the first cycle.

12. The power supply control device according to claim 8, wherein
the microcomputer is configured to periodically acquire the state of the input port at a cycle shorter than the predetermined pulse width.

\* \* \* \* \*